Sept. 2, 1924.

A. E. DRISSNER

RECESSING OR CUTTING ATTACHMENT

Filed March 11, 1922

Inventor
Alfred E. Drissner
by his Attorneys,

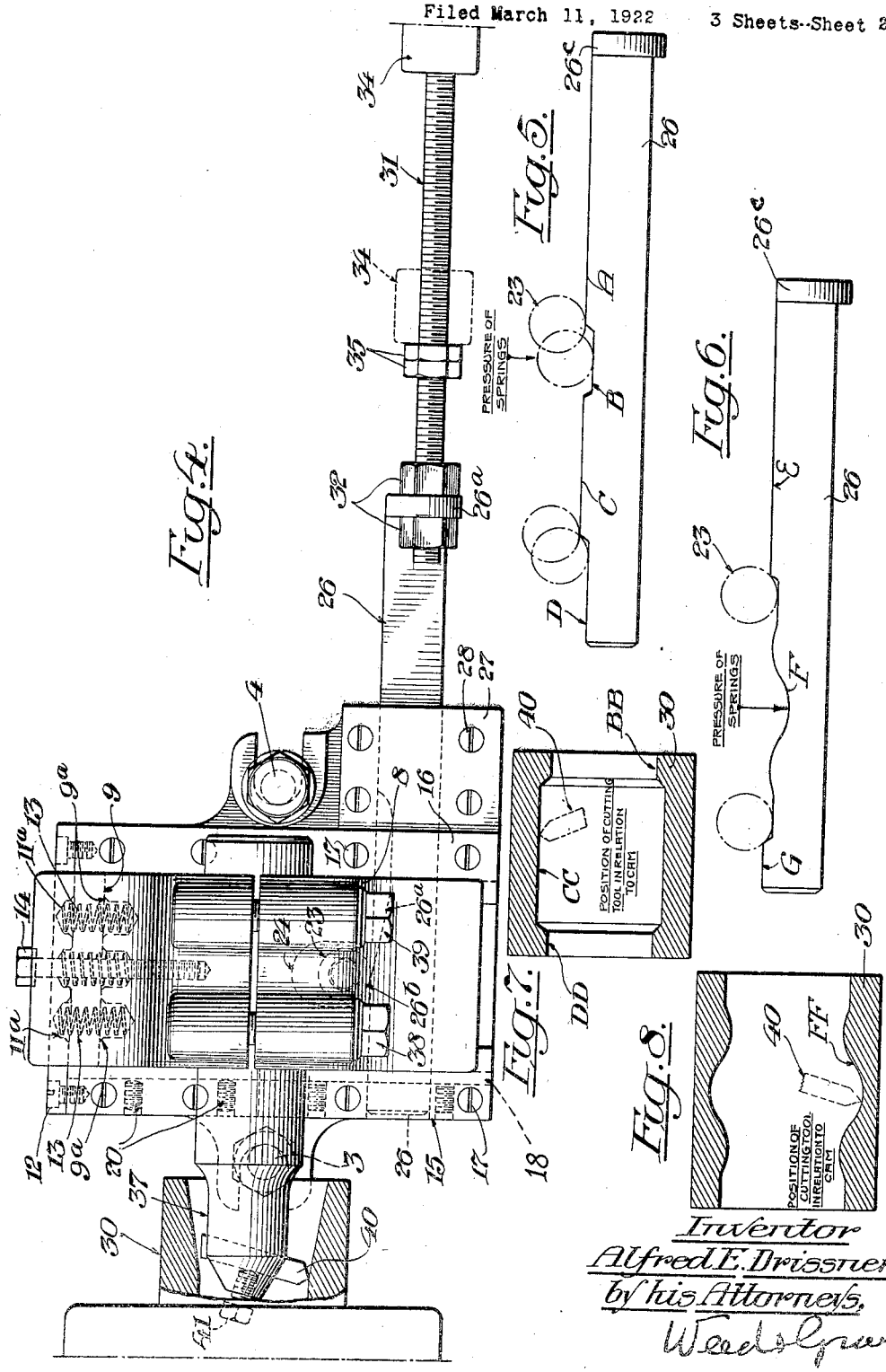

Sept. 2, 1924.
A. E. DRISSNER
1,506,737
RECESSING OR CUTTING ATTACHMENT
Filed March 11, 1922   3 Sheets-Sheet 3
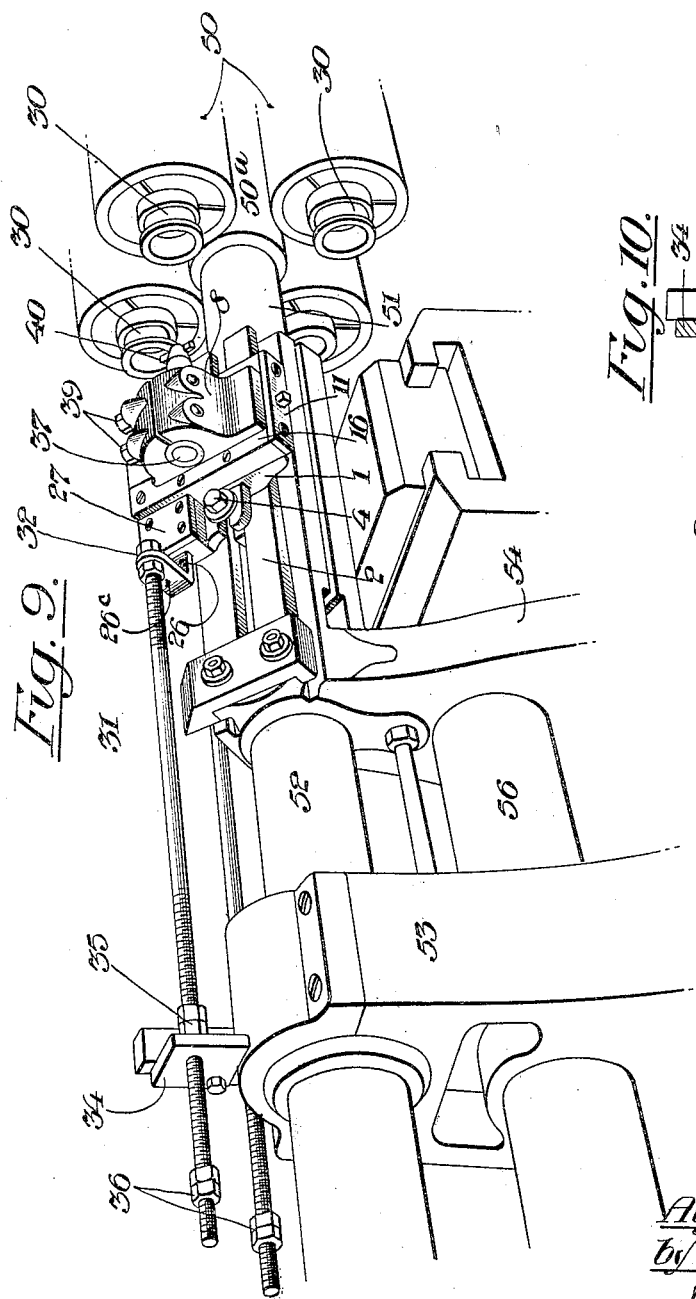
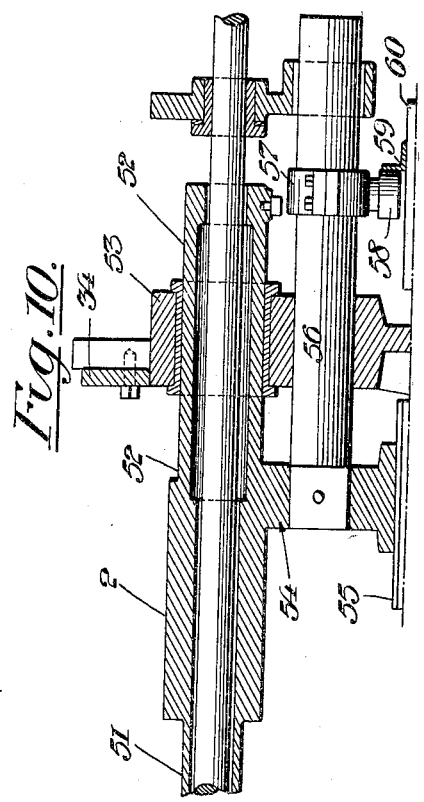
Inventor
Alfred E. Drissner
by his Attorneys,
Weed & Gray Patented Sept. 2, 1924.

1,506,737

UNITED STATES PATENT OFFICE.

ALFRED E. DRISSNER, OF CLEVELAND, OHIO, ASSIGNOR TO THE NATIONAL ACME COMPANY, OF CLEVELAND, OHIO, A CORPORATION OF OHIO.

RECESSING OR CUTTING ATTACHMENT.

Application filed March 11, 1922. Serial No. 542,934.

*To all whom it may concern:*

Be it known that I, ALFRED E. DRISSNER, a citizen of the United States, residing at Cleveland, in the county of Cuyahoga and State of Ohio, have invented certain new and useful Improvements in Recessing or Cutting Attachments, of which the following is a specification.

This invention relates to recessing or cutting attachments, adapted for use with various types of automatic machinery such as single and multiple spindle lathes, and more particularly to cutting attachments for cutting tapered surfaces or for recessing the work, an object of the invention being to provide an improved mechanism of this character particularly adapted to cut, by means of a single cutting tool, any predetermined shape, form, or pattern according to the shape, form or pattern of the cam used, and translated therefrom to the tool, whereby the work may be either bored or turned down on the outside.

A further object of the invention is the provision of an improved cutting attachment in which the tool after completing its cut does not follow or drag over the work during its backward movement, and thus scratch or mar the same and interfere with accurate production.

A further object of this invention is the provision of such a cutting attachment which will be efficient, effective and accurate in operation; which is adapted to be used in conjunction with other tools of the machine upon which it is mounted and controlled by the same lead cam so that it may start and finish its cutting operation at the same time that other operations are completed; which will be automatic in operation and readily adjusted and wherein the cutting tool is easily removable for grinding and also easily replaceable, and comparatively simple in construction and durable in use.

Other objects of this invention will appear in the following description thereof, reference being had to the accompanying drawings forming a part of this specification wherein like reference characters indicate corresponding parts in the several views and wherein Fig. 1 is a plan view illustrating the present improved attachment in its rearward position; Fig. 2 is a side elevation illustrating the attachment as shown in Fig. 1; Fig. 3 is a right hand end view of the structure shown in Fig. 2; Fig. 4 is a view similar to Fig. 1 illustrating the mechanism in its forward position, or that position in which it is finishing the cutting of a tapered bore; Fig. 5 is a view illustrating a modified form of cam; Fig. 6 is a view illustrating a further modified form of cam; Fig. 7 illustrates diagrammatically the work when cut in accordance with the cam shown in Fig. 5; Fig. 8 is a diagrammatic view illustrating the form of cut and the position of the cutting tool when using a cam such as illustrated in Fig. 6, Fig. 9 is a perspective view illustrating a machine provided with the present attachment; and Fig. 10 is a vertical section of the tool slide and machine illustrating the manner of operation of the slide.

Before explaining in detail the present improvement and mode of operation thereof, it is desired to have it understood that the invention is not limited to the details of construction and arrangement of parts which are illustrated in the accompanying drawings, since the invention is capable of other embodiments, and that the phraseology which is employed is for the purpose of description and not of limitation.

The important advantages of the present improved cutting attachment reside in the fact that by means of a single tool various shapes of cut may be made corresponding to the shape or pattern of the cam used, and then after the cutting tool has finished boring or cutting, the tool does not follow the work when the slide is withdrawn or moved backward away from the work. As a result of this last important feature it will be seen that the danger of the tool scratching or marring the work as when it is dragged back over the work, is eliminated, such being a great disadvantage when accurate work is desired. A further important advantage of the present improvement is that it can be used in conjunction with other tools of the machine upon which it is mounted and can be controlled by the same lead cam. Thus the length of taper or cut is controlled by the travel resulting from the main lead cam of the machine, and therefore the cutting tool will begin and finish cutting at the same time as the other operations of the machine. The present improvement consequently forms a ready attachment for various types of machines without requiring any material change or reorganization of the same.

Referring particularly to Figs. 9 and 10, wherein by way of example an automatic multiple spindle machine is illustrated with the present improved attachment applied thereto, the machine may comprise a plurality of work spindles 50 carried by a suitable cylinder which is intermittently indexed, the work 30 being suitably carried by these spindles. The indexing cylinder is provided with a tool slide supporting bearing 50a for slidably supporting a tubular or shaft extension 51 of the main tool slide 2. Projecting from the opposite or rear end of the tool slide 2 is a similar tubular member or shaft 52 which is slidably mounted in an extended bearing 53 of the machine. The tool slide is provided with a depending bracket 54 having the lower end slidingly supported on ways 55 on the bed of the machine. A shaft 56 is secured to the bracket 54 and extends rearwardly in parallel relation to the tool slide 2, this shaft having a bearing in the extended bearing 53. Bolted to the supplemental tool slide shaft 56 is a split collar 57, and secured to this collar is a roller 58 adapted to be engaged by a cam 59 on a cam drum 60, which is driven by the cam shaft of the machine.

A further detailed description of the machine is herein not deemed necessary as the same is fully described in Patent No. 1,320,609, dated November 4, 1919, of which I am a co-inventor.

The present improvement in its preferred form comprises a base 1 adapted to be mounted upon the main tool slide 2 of the machine and held thereon as by means of screws 3 and 4 and T-nuts 5 and 6. The tool slide 2 is of four-squared formation and the sides thereof are provided with dove-tail grooves for the reception of the screws 3 and 4 and also for permitting attachment of various end working tools. The base is suitably machined at 7 so as to provide a slideway for a suitable laterally shiftable tool holder slide 8, the latter being undercut as at 9, and into the end faces thereof three holes 9a are drilled. From the base of the center hole is drilled and tapped a smaller hole of suitable depth and diameter for the reception of the screw 14 hereinafter mentioned. Against the end face of the base 1 is bolted a plate 11 which is suitably secured in position as indicated at 12. Directly in line with the three holes 9a in the tool holder, three holes 11a are drilled to a suitable depth and diameter in the inner face of the plate 11, the center hole having a continuation of smaller diameter through the plate 11. Between the plate 11 and tool holder 8 are placed three coiled springs 13 of suitable strength, the ends of the springs being located in the opposite holes 9a and 11a which act as guides therefor. Through the central hole in the plate 11 and the central spring 13 is located a screw 14 which is screwed into the tool holder.

The tool holder slide 8 is held in proper position in the base 1 by means of a pair of oppositely located plates 15 and 16 which are bolted or otherwise secured to the base as at 17. A gib 18 is placed in position between the tool holder slide 8 and the base 1 as by means of a pin 19 and screws 20. The gib screws 20 may be adjusted to the proper pressure against the gib 18 so that the tool holder slide 8 may be moved laterally or transversely in the base, thereby permitting the same to slide properly therein.

As illustrated in Fig. 2 the tool holder slide is drilled and tapped as at 21 for the reception of a stud 22 constructed to support and retain in position beneath the tool holder slide 8, a roller 23, the base being suitably machined as at 24 so as to provide room for the travel of the roller. The base is also machined at 25 so as to provide a slot therethrough for the reception of a cam 26 shown as a shiftable or reciprocating cam member or bar, the same being held in position by means of a plate 27 secured to the base as by means of screws 28, the plate not only acting as a cover for the cam but also as a guide for the same.

Suitable cam limiting means is provided for limiting the movement of the cam and tool one relatively to the other at predetermined times. In the present instance the cam bar 26 at its rear end is bent at right angles as at 26c and is drilled to receive a screw rod 31. Mounted upon this rod at each side of the right angled end 26a is a nut 32 and the rod 31 is adapted to freely pass through a stationary bracket 34 located upon a suitable stationary part of the machine. At suitable predetermined distances apart and at opposite sides of the stationary bracket 34, are located lock or adjusting nuts 35 and 36, the same being adjustable into various positions on the rod 31 for the purpose hereinafter described.

The tool holder slide 8 is suitably bored for the reception of a tool holder 37, the latter being rigidly held therein as by means of screws 38 and 39, and in the end of the tool holder adjacent to the work 30 is secured by means of a set screw 41, a cutting tool 40. The tool holder may of course be of any preferred design or shape such that it will clear the work properly, and the cutting tool may also be of any preferred kind or form.

In operation it will be seen that when the main tool slide 2 of the machine upon which the present improved attachment is mounted, is shifted forwardly from the position shown in Fig. 1 by the cam 59, the base and the entire attachment and cam also move forwardly with this main slide toward the work. When however the nuts 36 of the cam rod 31 engage the stationary bracket 34, the cam 26 stops traveling and remains stationary while the base 1 and tool holder slide 8 still continue their forward travel toward the work. At this time the roller 23 starts to travel up the angular face 26$^a$ of the cam and starts to cut the work, this cutting operation continuing until the tool reaches the position shown in Fig. 4, at which time the cutting or boring operation of the tool is completed, whereupon the tool slide 8 with the main slide 2 and cam bar 26 start to move back from the work 30. As the tool slide 8 moves backward from the work, the tool holder 37 and its cutter 40 also recede from the work but remain in the same fixed lateral position with relation to the work as shown in Fig 4 for the reason that the cam roller 23 has previously reached the straight face 26$^b$ of the cam and remains in this position until the adjusting nuts 35 engage in their rearward movement the stationary bracket 34. At this point the movement of the cam bar rearwardly with the tool holder is arrested while the tool holder will continue to move rearwardly relatively to the cam, thus permitting the roller 23, by virtue of the action of springs 13, to travel down over the angular face 26$^a$ of the cam to its original position in readiness for the next operation.

It will be noted that the adjusting nuts 35 and 36 may be adjusted to any suitable position in accordance with the length of travel of the tool 40 during the cutting operation, the distance between bracket 34 and nuts 36 being the distance which the attachment travels before the actual cutting of the tool 40 begins. Thus it will be understood that the closer the nuts 36 are positioned to the bracket 34, the sooner the cutting operation will begin. Furthermore it will be seen that the cutting tool will not drag over the work when the slide moves backwardly therefrom in that the roller is held in such position that the tool is pulled straight out of the work until the nuts 35 strike the bracket 34.

In Fig. 5 a modified form of cam is illustrated, which may be substituted for the pattern cam 26, and it will be noted in this instance that the cutting end of the tool 40 is positioned opposite to that shown in Fig. 4. By adjusting the adjusting nuts the roller 23 commences its travel along the side A and is forced by means of springs 13 into the recess B thereby causing the cutter to clear the diameter BB in the work as shown in Fig. 7. The roller thereupon travels up on the face C of the cam and tool 40 cuts the recess CC in the work, and upon completion thereof the roller is forced by the springs onto the face D of the cam thereby clearing the diameter DD in the work. In withdrawing the tool from the work, the cutter remains in this position until the nuts 35 engage the bracket 34 and then the cam and roller are forced by virtue of the springs into their original position.

In Fig. 6 a still different form of cam is shown by way of example and in operation the cutter is positioned in substantially the same manner as illustrated in Figs. 1 and 4. In this case however the pressure of the springs is utilized to assist in the cutting operation, the springs of course being of suitable strength to force the tool to the cut. The roller 23 commences its travel on the side E and then the springs 13 force the roller over the cam surface or face F such movement being translated to the tool 40, which latter thereby cuts the corresponding surface FF in the work. In this case the cutter is forced into its cutting position by means of the pressure of the springs and at the end of the cutting operation the roller is forced to travel onto the surface G, and as in the previous embodiment, the roller and hence the tool remains in this fixed position until the tool is clear of the work and until the adjusting nuts 35 engage the stationary support 34. At this point as hereinbefore described the tool holder is shifted relatively to the cam and the parts are thereupon shifted to their original positions.

In the present instance the attachment is illustrated with a tool holder and cutting tool adapted to be used for boring or cutting the inside diameter, but of course it is obvious that by substituting a different tool holder the present attachment can be used for cutting outside form or taper on the work. Obviously by using a blank cam, the present improved attachment can be used for either straight boring or straight turning.

It is to be understood that by describing in detail herein any particular form structure or arrangement, it is not intended to limit the invention beyond the terms of the several claims or the requirements of the prior art.

I claim as my invention:

1. The combination of a work holder and tool holder adapted to carry a tool, means for moving one of said holders relatively to the other in longitudinal directions, a pattern cam constructed to shift said movable holder transversely thereby to bring the tool into position to cut the work in accordance with the pattern on the cam and to shift the same into position to prevent the tool from dragging over the work during the movement of the tool and work one way from the other, and means for restoring the pattern cam and said movable holder into their original positions during the final part of the movement of the tool and work one away from the other.

2. The combination of a work holder and tool holder adapted to carry a tool, means for moving one of said holders relatively to the other in longitudinal directions, a movable pattern cam constructed to shift said movable holder transversely thereby to bring the tool into position to cut the work in accordance with the pattern on the cam and to shift the same into position to prevent the tool from dragging over the work during the movement of the tool and work one away from the other, means for restoring the pattern cam and said movable holder into their original positions during the final part of the movement of the tool and the work one away from the other, and means for varying within substantial limits the position at which the pattern cam commences to function.

3. The combination of a work holder, a transversely slidable tool holder, a cutting tool carried thereby, means for shifting said work and tool holder longitudinally one toward and from the other, pattern means, means for shifting said tool holder and pattern means one transversely relatively to the other during the cutting operation, means for maintaining the same in relatively fixed position during the withdrawal of the tool and work holder one from the other, and means for effecting relative shiftable movement of said pattern means and tool holder to restore the positions thereof.

4. In a metal working machine the combination of a work holder, a recessing or cutting attachment comprising a compound slide including a pair of slides moving together and one transversely relatively to the other, and a tool carried by one of said slides, a pattern in position to control the movement of said tool and corresponding to the pattern to be cut in the work, means for shifting said slides relatively to the pattern during the cutting operation, means for shifting said slides and pattern together to withdraw the tool from the work, and means for limiting the movement of said pattern to permit the slides to move relatively thereto.

5. In a metal working machine the combination of a work holder, a recessing or cutting attachment comprising a compound slide including a pair of slides moving together and one transversely relatively to the other, and a tool carried by one of said slides, a pattern in position to control the movement of said tool and corresponding to the pattern to be cut in the work, means for shifting said slides relatively to the pattern during the cutting operation, means for shifting said slides and pattern together to withdraw the tool from the work, and means for automatically restoring the original positions of said slides and pattern.

6. The combination of a work holder and a tool holder, a tool carried by said tool holder, pattern means, mechanism for shifting one of said holders and said pattern means one relatively to the other and for shifting said holder toward the other holder during the cutting operation to cause the tool to cut the work in accordance with the pattern, means for shifting said holder in the opposite direction to withdraw the tool and work one from the other, means for maintaining the pattern means and said shiftable holder in fixed relative position during such withdrawal, and means effective to cause relative shiftable movement of said shiftable holder and pattern means to restore the positions thereof.

7. The combination of a tool holder, a cutting tool carried thereby, means for shifting said tool and tool holder toward and from the work, a pattern cam for shifting said tool holder in directions parallel to the pattern of said cam, and stop means carried by said cam and operative for controlling the movement of said pattern cam in opposite directions.

8. The combination of a work holder, a tool holder, a cutting tool carried thereby, means for shifting said tool and tool holder toward and from the work, a pattern cam for shifting said tool holder in directions parallel to the pattern of said cam, and a pair of adjustable stop means carried by said cam and operative for controlling the movement of said pattern cam.

9. The combination of a tool holder, a tool carried thereby, pattern means, mechanism for reciprocating said tool and pattern means together toward and from the work, means for limiting the movement of said pattern means to cause the tool to cut the work in accordance with the pattern, and means for limiting the movement of said pattern means after withdrawal of the tool from the work to cause the tool and pattern means to be restored to original position.

10. The combination of a work holder, a main slide, means for shifting the same toward and from the work holder, a tool holder slidable transversely thereto, a pattern cam cooperating with said tool holder, and mechanism supported in position for causing relative movement of said tool holder and pattern cam in one direction during the cutting operation and including means for causing relative movement of the tool holder and cam in the opposite direction after the withdrawal of the tool from the work.

11. The combination of a work holder, a main slide, means for shifting the same toward and from the work holder, a tool holder slidable transversely thereto, a pattern cam cooperating with said tool holder, said tool holder and cam cooperating for movement together into initial cutting position and out of initial cutting position, and cooperating for relative movement during the cutting operation, said tool holder having a cam roll engaging said pattern cam and said main slide having a guide slot for receiving said cam roll.

12. The combination of a work holder, a tool holder, a tool carried thereby, pattern means, means for reciprocating one of said holders relatively to the other to cause the tool to cut the work in accordance with the pattern and to withdraw the tool and work one from the other, means for controlling said pattern means to cause relative shiftable movement of one of said holders and said pattern means, and means for controlling said pattern means to cause reverse relative shiftable movement thereof after withdrawal of the tool and work one from the other.

13. The combination of a work holder and support movable one toward and from the other, a tool holder slidable transversely of said support and having a cutting tool, pattern means cooperating with said tool holder for shifting said tool to cut a pattern in the work, and mechanism operative for releasing the tool holder from the pattern only after withdrawal of the work and tool one from the other.

14. The combination of a work holder and support movable one toward and from the other, a tool holder slidable transversely of said support and having a cutting tool, pattern means cooperating with said tool holder for shifting said tool to cut a pattern in the work, and mechanism operative for releasing the tool holder from the pattern only after withdrawal of the work and tool one from the other, said mechanism comprising an adjustable stop carried by said pattern means.

15. The combination of a work holder and support movable one toward and from the other, a tool holder slidable transversely of said support and having a cutting tool, pattern means cooperating with said tool holder for shifting said tool to cut a pattern in the work, and mechanism operative for releasing the tool holder from the pattern only after withdrawal of the work and tool one from the other, said mechanism comprising an adjustable stop carried by said pattern means and resilient means coacting with said tool holder.

16. The combination of a work holder and a tool holder, a tool carried by said tool holder, pattern means, mechanism for shifting one of said holders and said pattern means one relatively to the other and for shifting said holder toward the other holder during the cutting operation to cause the tool to cut the work in accordance with the pattern, means for shifting said holder in the opposite direction to withdraw the tool and work one from the other, means for maintaining the pattern means and said shiftable holder in fixed relative position during such withdrawal, and adjustable means automatically operative to cause relative shiftable movement of said shiftable holder and pattern means to restore the positions thereof.

17. The combination of a pair of slides adapted to reciprocate together and one transversely to the other, a work holder and a tool holder, means for connecting one of said holders to said transversely movable slide, pattern means coacting with said last holder, mechanism for shifting said slides together and for shifting the same and said pattern means one relatively to the other to cause transverse shiftable movement of said transversely movable slide thereby causing the tool to cut the work in accordance with the pattern of said pattern means, means for shifting said slides and pattern means together in the opposite direction, and mechanism operative to restore the original relative positions of said slides and pattern means.

18. The combination of a pair of slides adapted to reciprocate together and one transversely to the other, a work holder and a tool holder, means for connecting one of said holders to said transversely movable slide, pattern means coacting with said last holder, mechanism for shifting said slides together and for shifting the same and said pattern means one relatively to the other to cause transverse shiftable movement of said transversely movable slide thereby causing the tool to cut the work in accordance with the pattern of said pattern means, means for shifting said slides and pattern means together in the opposite direction, and adjustable mechanism automatically operative to restore the original relative positions of said slides and pattern means.

19. The combination of a tool holder, a tool carried thereby, pattern means, mechanism operative for shifting said tool relative to said pattern means to cut the work in accordance with the pattern thereof and also operative to shift said tool and pattern means in fixed relative position away from the work, and means for automatically restoring said pattern means and tool to original position.

20. In a metal working machine having a work holder, a support, a cross slide carried by said support, a tool holder having a cutting tool and mounted on said slide, pattern means mounted at one side of the longitudinal axis of the tool holder and cooperating therewith, resilient means at the opposite side of said axis for maintaining said tool holder in constant engagement with the pattern means, means for shifting said support and pattern means relatively to the work holder, and means for limiting the movement of said pattern means.

21. The combination of a tool holder, a tool carried thereby, pattern means, mechanism operative for shifting said tool relative to said pattern means to cut the work in accordance with the pattern thereof and also operative to shift said tool and pattern means in fixed relative position away from the work, and means cooperating with said pattern means during the withdrawal thereof for restoring the pattern means and tool to the original positions thereof.

22. The combination of a tool holder, a tool carried thereby, pattern means, mechanism operative for shifting said tool relative to said pattern means to cut the work in accordance with the pattern thereof and also operative to shift said tool and pattern means in fixed relative position away from the work, and means operative upon the withdrawal of said tool and pattern means to cause said tool to be shifted relative to the pattern means in a reverse direction from said first shiftable movement thereof.

23. The combination of a tool holder, a tool carried thereby, pattern means, mechanism operative for shifting said tool relative to said pattern means to cut the work in accordance with the pattern thereof and also operative to shift said tool and pattern means in fixed relative position away from the work, and means operative to cause relative shiftable movement of said tool and pattern means upon said withdrawal thereof.

24. The combination of a work holder and support movable one toward and from the other, a tool holder slidable transversely of said support and having a cutting tool, pattern means cooperating with said tool holder for shifting said tool to cut a pattern in the work, said pattern means having a threaded member, and stop means adjustable upon said threaded member.

25. The combination of a work holder and support movable one toward and from the other, a tool holder slidable transversely of said support and having a cutting tool, pattern means cooperating with said tool holder for shifting said tool to cut a pattern in the work, said pattern means having a threaded member, and a pair of stop means adjustable upon said threaded member.

26. In a metal working machine the combination of a work holder, a recessing or cutting attachment comprising a tool support carrying a tool, a pattern mounted for shiftable movement at predetermined times, and means for shifting said attachment and work holder one toward the other to cause the tool to cut the work in accordance with said pattern, said machine having a stop and said pattern having a stop movable relatively to said stop for controlling the movement of the pattern, and means for adjusting one of said stops.

27. The combination of a work holder, a tool holder, a cutting tool carried thereby, pattern means, means for shifting one of said holders and said pattern means one relatively to the other during the cutting operation, means for maintaining the same in fixed relative position during the withdrawal of the tool and work one from the other, and means automatically operative to restore said holder and pattern means to original position.

28. The combination of a work holder, a tool holder, a cutting tool carried thereby, pattern means, means for shifting one of said holders and said pattern means one relatively to the other during the cutting operation, means for withdrawing the tool and work one from the other without the tool dragging over the work, and means operative to restore said holder and pattern means to original position.

29. The combination of a work holder and a tool holder adapted to carry a tool, said holder movable one relatively to the other in longitudinal directions, a movable pattern cam constructed to shift said movable holder transversely into position to have the tool cut the work in accordance with the pattern of the cam, and means for varying within substantial limits the position at which the pattern cam commences to function and also for restoring said pattern cam and movable holder to original position.

Signed at Cleveland, Ohio, this 6th day of March, 1922.

ALFRED E. DRISSNER.